US012406093B2

(12) United States Patent
Goodsitt et al.

(10) Patent No.: US 12,406,093 B2
(45) Date of Patent: Sep. 2, 2025

(54) SYSTEMS AND METHODS FOR PREVENTING SENSITIVE DATA LEAKAGE DURING LABEL PROPAGATION

(71) Applicant: Capital One Services, LLC, McLean, VA (US)

(72) Inventors: Jeremy Goodsitt, Champaign, IL (US); Michael Davis, Arlington, VA (US); Taylor Turner, Richmond, VA (US); Kenny Bean, Herndon, VA (US); Tyler Farnan, San Diego, CA (US)

(73) Assignee: Capital One Services, LLC, McLean, VA (US)

( * ) Notice: Subject to any disclaimer, the term of this patent is extended or adjusted under 35 U.S.C. 154(b) by 205 days.

(21) Appl. No.: 18/452,630

(22) Filed: Aug. 21, 2023

(65) Prior Publication Data
US 2025/0068768 A1    Feb. 27, 2025

(51) Int. Cl.
*G06F 21/00* (2013.01)
*G06F 21/62* (2013.01)

(52) U.S. Cl.
CPC ................ *G06F 21/6254* (2013.01)

(58) Field of Classification Search
CPC ............ G06F 21/6254; G06F 21/6245
See application file for complete search history.

(56) References Cited

U.S. PATENT DOCUMENTS

| | | | |
|---|---|---|---|
| 2004/0205038 A1* | 10/2004 | Lee .................. | G06V 10/457 706/46 |
| 2007/0203908 A1* | 8/2007 | Wang ................ | G06F 16/3331 707/E17.069 |
| 2018/0315141 A1* | 11/2018 | Hunn ................ | G06F 9/547 |
| 2021/0295987 A1* | 9/2021 | Thomas ............. | G16H 40/20 |
| 2021/0342704 A1* | 11/2021 | Pavlov ............... | G06F 16/313 |
| 2024/0120067 A1* | 4/2024 | Maharjan ........... | G16H 20/30 |

OTHER PUBLICATIONS

Kongsgard et al., "Data Leakage Prevention for Secure Cross-Domain Information Exchange", IEEE Communications Magazine, Oct. 2017.*

* cited by examiner

*Primary Examiner* — Morshed Mehedi
(74) *Attorney, Agent, or Firm* — Foley & Lardner LLP

(57) ABSTRACT

Systems and methods for novel uses and/or improvements to data labeling applications, particularly data labeling applications involving sensitive data. As one example, systems and methods are described herein for preventing sensitive data leakage, using weak learner libraries, during label propagation.

20 Claims, 4 Drawing Sheets

SYSTEMS AND METHODS FOR PREVENTING SENSITIVE DATA LEAKAGE DURING LABEL PROPAGATION

BACKGROUND

Data labeling is the process of annotating or tagging data with relevant information to make it usable for one or more models. These models may comprise one or more algorithms and/or artificial intelligence components, including, but not limited to, components related to machine learning, deep learning, etc. (referred to collectively herein as models). Data labeling involves adding labels or tags to the input data, which represents the ground truth or the correct output corresponding to each input. This labeled data is then used to train and validate models. Data labeling is essential because most learning algorithms, particularly supervised ones, require labeled data to learn and make accurate predictions. By providing labeled examples, the algorithm can understand the patterns and relationships between the input data and their corresponding outputs.

However, data labeling, and the processes for data labeling, are susceptible to data leakage. Data leakage may refer to the unintended or accidental exposure of information from a dataset during creation and/or use of a model. This is particularly problematic in instances in which data labeling needs to be applied to sensitive data. Sensitive data, which may be confidential or personally identifiable information (PII), may refer to any type of information that, if disclosed or accessed by unauthorized parties, could result in harm, privacy breaches, identity theft, financial loss, or other negative consequences for individuals or organizations. Sensitive data typically includes private and personal information that requires protection to ensure its confidentiality, integrity, and availability.

SUMMARY

Systems and methods are described herein for novel uses and/or improvements to data labeling applications, particularly data labeling applications involving sensitive data. As one example, systems and methods are described herein for preventing sensitive data leakage, using weak learner libraries, during label propagation.

For example, existing systems may use artificial intelligence for data labeling. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task.

However, data leakage can significantly impact the validity and generalization of artificial intelligence models, as it can introduce a false sense of accuracy and make the model less effective in real-world scenarios. There are two main types of data leakage: train-test data leakage and target leakage. Train-test data leakage occurs when information from the test set (unseen data) inadvertently leaks into the training set (data used to build the model). As a result, the model may learn to recognize patterns specific to the test set rather than generalizing well to new, unseen data. This can lead to overly optimistic evaluation metrics during model validation, making the model's performance appear better than it actually is. For example, if the test set is not properly separated from the training set, and the artificial intelligence model accidentally learns specific patterns from the test set, it will perform well on the test set but poorly on new data. Additionally, when processing sensitive data, any train-test data that is leaked (e.g., a specific name, PII, etc.) may create a security and/or privacy issue. Target leakage happens when data that would not be available at the time of prediction is included in the training set, leading to unrealistic and overfit artificial intelligence models.

To overcome these technical deficiencies, systems and methods are disclosed herein for preventing sensitive data leakage, using weak learner libraries, during label propagation. For example, in order to prevent data leakage, the system generates synthetic data based on actual data. The system then selects a plurality of weak learners based on the synthetic data. By doing so, the system prevents any data leakage of actual data during the weak learner selection process as any actual data is siloed in a protected environment and the weak learners are developed on synthetic data. The system may then determine the performance of selected weak learners on the actual data to ensure that the plurality of weak learners meets preassigned performance metrics. The system may then determine a library of weak learners for data propagation based on weak learners meeting the preassigned performance metrics. Furthermore, weak learners are relatively simple models, and they lack the capacity to memorize or overfit to the training data. As a result, they are less likely to memorize any noise or spurious patterns in the data that might lead to data leakage.

Additionally by creating a library of the weak learners, the weak learners are capable of boosting. For example, weak learners may be trained sequentially, and each subsequent model may focus on correcting the mistakes and/or gaps made by the previous models. By concentrating on the residuals (e.g., the differences between the actual and predicted values), the boosting process reduces the chances of fitting the noise in the data. By using a combination of weak learners in ensemble methods as found in the weak learner library, the model and/or models can effectively avoid data leakage and produce more robust and reliable predictions on new, unseen data. For example, the ensemble's collective strength allows it to learn complex patterns from the data without falling into the trap of overfitting or memorizing noise, leading to improved labeling performance.

In some aspects, systems and methods are described herein for preventing sensitive data leakage using weak learner libraries during label propagation. For example, the system may receive a first data set, wherein the first data set comprises a plurality of sensitive characteristics. The system may generate a second data set, wherein the second data set is a synthetic data set corresponding to the first data set. The system may determine, based on the second data set, a first weak learner for a first labeling task, wherein the first labeling task is specific to the first data set. The system may validate, based on the first data set, the first weak learner. In response to validating the first weak learner, the system may add the first weak learner to a first weak learner library for the first data set.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
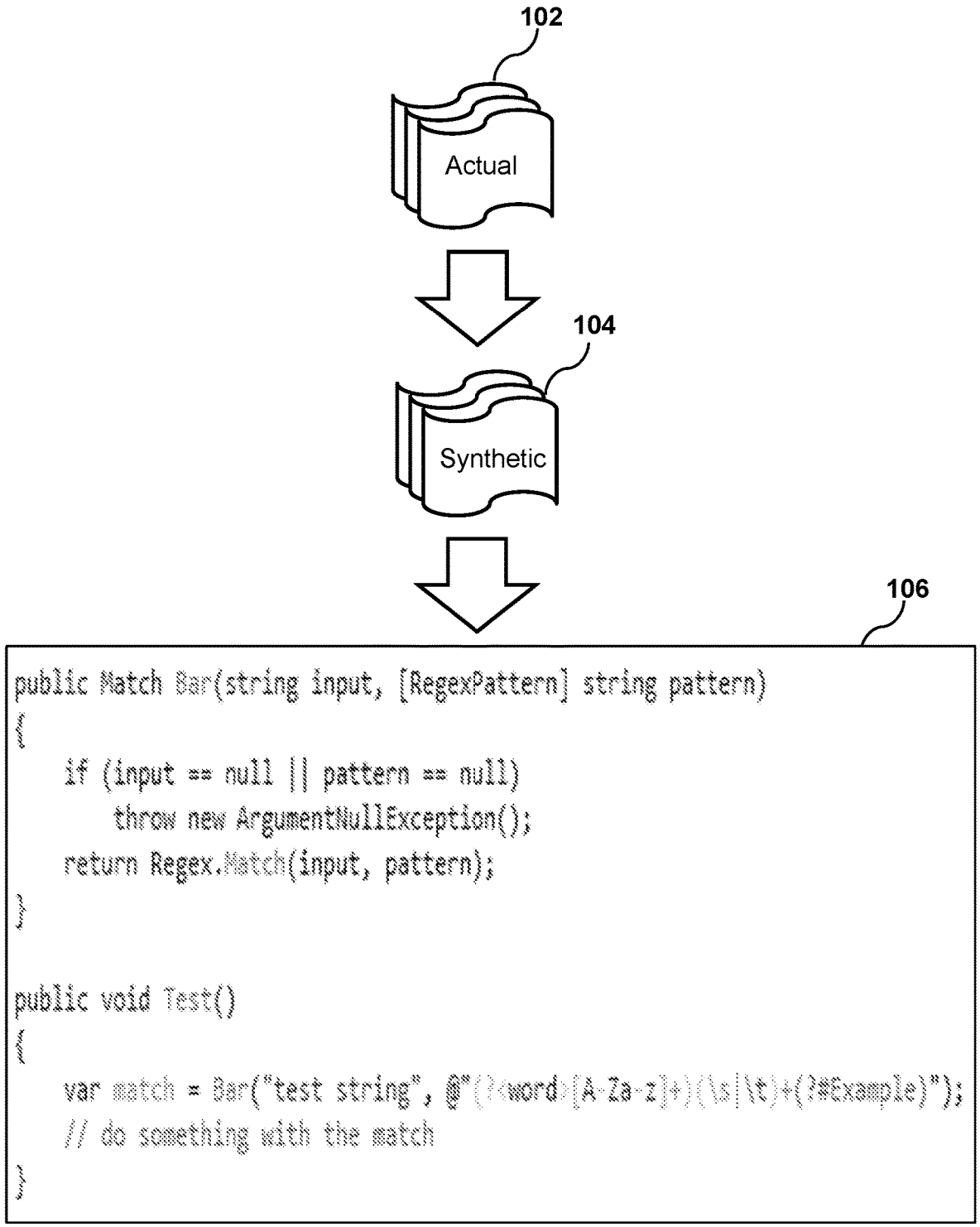
FIG. 1 shows an illustrative diagram for determining a weak learner for a labeling task, in accordance with one or more embodiments.

FIG. 1 shows an illustrative diagram for determining a weak learner for a labeling task, in accordance with one or more embodiments. For example, the system may determine a weak learner in order to prevent sensitive data leakage, using weak learner libraries, during label propagation.

In some embodiments, the system may use a plurality of different (and/or protected) environments. For example, the system prevents any data leakage of actual data during the weak learner selection process as any actual data is siloed in a protected environment and the weak learners are developed on synthetic data. A protected environment may typically refer to a controlled or isolated setting in which certain aspects of data or models are safeguarded to prevent unintended consequences or ethical concerns. In situations where sensitive or private data is involved, a protected environment could mean creating a secure environment where data is anonymized or aggregated to protect individual identities while still allowing useful insights to be derived from the data. This is particularly relevant in fields like healthcare, finance, and social sciences where data privacy regulations must be adhered to. Additionally or alternatively, different protective environments may include specific personnel and/or systems. By limiting these personnel to the given protective environment, the overall security is increased. For example, the protected environment may involve implementing techniques, safeguards, and/or protocols that ensure the responsible and ethical use of models and data. These techniques could involve algorithmic adjustments, dataset preprocessing, model auditing, and ongoing monitoring to maintain fairness, reduce bias, and/or preserve privacy.

In some embodiments, the different environments may comprise an environment that include actual data and an environment that includes only synthetic data. For example, only synthetic data and/or results that do not leak actual data may exit the protected environment. Whereas, the less secure environment has synthetic data, and a person/system can evaluate weak learners, iterate on them, etc. in this environment before submitting for evaluation in the protected environment.

Sensitive data, which may be confidential or personally identifiable information (PII), may refer to any type of information that, if disclosed or accessed by unauthorized parties, could result in harm, privacy breaches, identity theft, financial loss, or other negative consequences for individuals or organizations. Sensitive data typically includes private and personal information that requires protection to ensure its confidentiality, integrity, and availability. Examples of sensitive data include: personal identifiers (e.g., information that directly identifies an individual), such as: Full name, Social Security Number (SSN), National Identification Number, Date of Birth, Passport Number, Driver's License Number, and Financial Information (e.g., data related to financial transactions, banking details, and payment information), such as credit card numbers bank account numbers, PIN codes or passwords, and Tax Identification Number (TIN). Sensitive data may also include health information (e.g., sensitive medical and health-related data), such as: medical history, health conditions, treatment information, and health insurance information. Sensitive data may also include biometric data (e.g., unique physical or behavioral characteristics used for identification), such as: fingerprints, retina or iris scans, facial recognition data, and voiceprints. Sensitive data may also include location data, which may include information about an individual's current or historical location, which can be sensitive when linked to specific individuals. Sensitive data may also include passwords and authentication data-data used to verify an individual's identity, including login credentials and authentication tokens.

Data leakage, in the context of data science and machine learning, refers to the unintended or accidental exposure of sensitive or confidential information from a dataset to the model during the training process. It occurs when information that should not be accessible to the model is somehow included, allowing the model to learn from it and potentially lead to overly optimistic or biased performance results. Data leakage can significantly impact the validity and generalization of machine learning models, as it can introduce a false sense of accuracy and make the model less effective in real-world scenarios. There are two main types of data leakage: train-test data leakage and target leakage. Train-test data leakage occurs when information from the test set (unseen data) inadvertently leaks into the training set (data used to build the model). As a result, the model may learn to recognize patterns specific to the test set rather than generalizing well to new, unseen data. This can lead to overly optimistic evaluation metrics during model validation, making the model's performance appear better than it actually is. For example, if the test set is not properly separated from the training set, and the model accidentally learns specific patterns from the test set, it will perform well on the test set but poorly on new data. Target leakage happens when data that would not be available at the time of prediction is included in the training set, leading to unrealistic and overfit models. This can occur when features are derived using information that is dependent on the target variable, thereby "leaking" the target information into the model. For example, in a credit risk model, including information about whether a loan was repaid (target variable) as a feature in the training set would lead to target leakage since this information would not be available at the time the model makes predictions for new loan applications. To avoid data leakage, it is essential to carefully pre-process and partition the data, ensuring that the test set is entirely separate from the training set and that no information from the target variable is accidentally used as a feature during data preparation.

In some embodiments, label propagation may be a semi-supervised learning algorithm used for labeling tasks where only a small portion of the data is labeled, while the majority of the data remains unlabeled. The algorithm leverages the information from labeled data to propagate labels to unlabeled data points based on the underlying structure of the data. For example, each data point is represented as a node in a graph, where the edges between nodes represent the similarity or proximity between data points. The core idea of the algorithm is to propagate labels through the graph iteratively until a stable state is reached. In some embodiments, the system may build a graph representation of the data, where each data point is a node, and the edges between nodes are determined by a similarity measure. Common choices for the similarity measure include K-nearest neighbors or Gaussian kernel similarity. The system may then assign labels to the labeled data points in the graph. The initial labeled nodes act as "seeds" from which labels will be propagated to the rest of the graph. The system may then propagate labels from labeled nodes to unlabeled nodes iteratively. At each iteration, each unlabeled node takes on the label that is most prevalent among its neighboring nodes. The strength of label propagation is controlled by a parameter called the "alpha" value, which determines the balance between the initial labeled information and the propagated information. The label propagation process may continue iteratively until a stopping condition is met. This stopping condition can be a maximum number of iterations, reaching a stable state, or a predefined level of accuracy. After the algorithm converges, the labels of the unlabeled nodes are determined, and the model is considered trained. These propagated labels can be used for making predictions on new, unseen data. Label Propagation is particularly useful when obtaining a large amount of labeled data is expensive or time-consuming, and the data exhibits a certain level of local smoothness in its structure.

As shown in FIG. 1, the system may receive actual data 102. For example, the system may receive a first data set, wherein the first data set comprises a plurality of sensitive characteristics, wherein the first data set comprises actual data. The first data set may comprise content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

As described herein, a characteristic may comprise a feature or quality of data. For example, data may comprise any content and a characteristic may comprise any quality about that content. In some embodiments, a characteristic may comprise a data characteristic that defines its quality, usability, and significance (e.g., accuracy, completeness, consistency, timeliness, validity, reliability, relevance, granularity, accessibility, security, volume, variety, velocity, etc.). Accuracy refers to how close the data values are to the true or actual values they represent. Accurate data is free from errors and reflects the real-world observations it describes. Completeness indicates the extent to which data captures all relevant information for the given context. Incomplete data may lack certain attributes or have missing values, which can impact the analysis and conclusions drawn from it. Consistency ensures that data is uniform and coherent throughout its entire dataset. Consistent data should not contradict itself, and relationships between different data elements should be logical and harmonious. Timeliness relates to the relevance and freshness of data concerning the period it represents. In many applications, up-to-date data is crucial for making informed decisions. Validity assesses whether the data adheres to the defined rules and constraints. Valid data is relevant and fits the context of the analysis or application. Reliability signifies the degree of trustworthiness and consistency of data over time. Reliable data is consistent across different measurements and sources. Relevance gauges the appropriateness and usefulness of data for a specific task or objective. Relevant data is aligned with the goals of the analysis or decision-making process. Granularity refers to the level of detail or resolution present in the data. It can vary from coarse (aggregated) to fine (individual records). Uniqueness indicates whether each data entry is distinct and represents a separate entity or observation. Duplicate data can lead to inaccuracies and skewed analysis. Accessibility refers to the case with which data can be retrieved and used when required. Easy access to data is vital for efficient analysis and decision-making. Security addresses the protection of data from unauthorized access, alteration, or disclosure. Sensitive data requires robust security measures to maintain confidentiality and integrity. Volume represents the size of the dataset or the amount of data available. Large volumes of data require appropriate storage and processing capabilities. Variety pertains to the diverse types and formats of data, including structured, semi-structured, and unstructured data. Handling diverse data types can be challenging in certain analyses. Velocity relates to the speed at which data is generated, collected, and processed. High-velocity data requires efficient data handling and analysis techniques.

As shown in FIG. 1, the system may generate synthetic data 104. For example, the system may generate a second data set, wherein the second data set is a synthetic data set corresponding to the first data set. The system may generate synthetic data that is artificial data that resembles the actual data but does not contain actual information from the actual dataset. The system may do so because there is a lack of actual data or sharing the actual data is not possible due to privacy/security concerns.

The system may generate the synthetic data using one of a plurality of techniques based on characteristics in the actual data. In some embodiments, the system may use random sampling by generating random data that matches the statistical properties of the original dataset. For example, if the system has a dataset with numerical values following a certain distribution, the system may generate new data points using a random number generator with the same distribution. In some embodiments, the system may use data augmentation (e.g., in instances of image data). For example, the system may apply various transformations to existing data to create new samples. For example, in image processing, you can flip, rotate, resize, or crop images to create augmented versions of the original dataset. In some embodiments, the system may use generative models such as Generative Adversarial Networks (GANs) and/or Variational Autoencoders (VAEs). For example, GANs are deep learning models consisting of two parts: a generator and a discriminator. The generator tries to generate data that is similar to the original dataset, while the discriminator tries to distinguish between real and synthetic data. Through iterative training, GANs improve the quality of generated data. GANs are deep learning models consisting of two parts: a generator and a discriminator. The generator tries to generate data that is similar to the original dataset, while the discriminator tries to distinguish between real and synthetic data. Through iterative training, GANs improve the quality of generated data.

In some embodiments, the system may use Markov Models. Markov models are used when the data has a sequential or temporal nature. They model the probabilities of transitions between different states in the data and can be used to generate new sequences. In some embodiments, the system may use interpolation and extrapolation. For example, for tabular data, interpolation techniques like linear interpolation or spline interpolation can be used to generate new data points between existing ones. Extrapolation can also be used to create data points beyond the range of the existing data. In some embodiments, the system may use resampling methods. For example, resampling methods like bootstrapping and jackknife can be used to generate new datasets by randomly selecting and duplicating existing data points. In some embodiments, the system may use Restricted Boltzmann Machines (RBMs). RBMs are probabilistic graphical models that can learn the underlying structure of data. They can be used to generate new data samples that share similarities with the original dataset. In some embodiments, the system may use copula models. Copulas are used to model multivariate distributions by combining univariate distributions. They can be used to generate new synthetic data that follows the same correlation structure as the original data.

As shown in FIG. 1, the system may generate weak learner 106. For example, the system may determine, based on the second data set, a first weak learner for a first labeling task of a plurality of labeling tasks specific to the first data set. For example, weak learners may be models (or other code strings) that perform slightly better than random guessing but are not strong enough to make accurate predictions on their own. Common examples of weak learners include decision stumps (decision trees with a single split) and shallow decision trees. To generate weak learners, the system may use algorithms that have limited complexity or restrictions on their learning capabilities. The most common algorithm for generating weak learners used by the system may be a decision stump-a simple decision tree with only one split.

Figure 2:
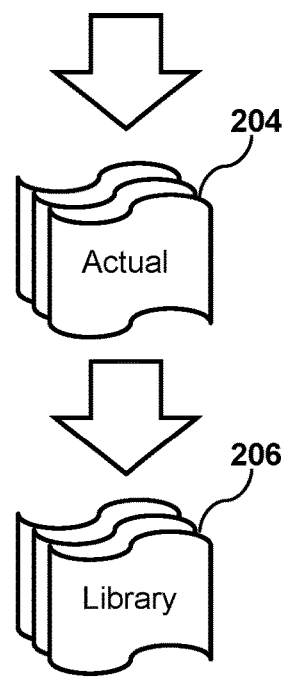
FIG. 2 shows an illustrative diagram for validating a weak learner, in accordance with one or more embodiments.

FIG. 2 shows an illustrative diagram for validating a weak learner, in accordance with one or more embodiments. For example, the system may determine a weak learner in order to prevent sensitive data leakage, using weak learner libraries, during label propagation. For example, the system may determine a weak learner in order to prevent sensitive data leakage, using weak learner libraries, during label propagation.

As shown in FIG. 2, the system may receive weak learner 202. For example, the system may validate, based on actual data 204, weak learner 202. For example, validating weak learners is an important step in the process of building ensemble models, such as boosting algorithms. Weak learners may be validated using cross-validation techniques to assess their performance and determine their suitability for inclusion in the ensemble. To validate the weak learners, the system may create a synthetic dataset as well as the actual dataset. For example, the system may use the synthetic data set as a training (e.g., development) set and the actual dataset as a validation (or test) set. The training set is used to train the weak learner, while the validation set is used to evaluate its performance. Cross-validation may be used to further assess the weak learner's performance. The training set is divided into several folds (e.g., 5 or 10 folds), and the weak learner is trained and validated multiple times, each time using a different fold as the validation set and the rest as the training set.

By doing so, the system gains a more robust estimate of the learner's performance. An evaluation metric is chosen to measure the performance (or accuracy) of the weak learner during cross-validation. The choice of metric depends on the specific problem and the type of learner being used. The system may use metrics that include accuracy, precision, recall, F1 score, area under the receiver operating characteristic curve (AUC-ROC), etc. Weak learners may have hyperparameters that need to be set before training. During cross-validation, different combinations of hyperparameters can be tested to find the optimal settings that yield the best performance. Based on the cross-validation results, a selection criterion may be defined to determine whether the weak learner is suitable for inclusion in the ensemble. For example, a weak learner may need to achieve a certain minimum performance threshold to be considered, or the best-performing weak learners based on the evaluation metric may be selected. Once the weak learners are validated and selected, they are combined using ensemble methods like boosting, bagging, or stacking to create a stronger model that can generalize better to new, unseen data.

In response to validating weak learner 202, the system may add weak learner 202 to weak learner library 206. A weak learner library may be a collection of machine learning algorithms or models that are designed to be simple and computationally efficient, yet perform better than random guessing on a given task. These weak learners may be used as building blocks in ensemble learning methods, where they are combined to create a more powerful and accurate model. Ensemble learning is a technique in which multiple models (weak learners) are trained independently and their predictions are combined to make a final prediction. The idea behind ensemble learning is that by combining the predictions of multiple models, the overall performance can be improved and the weaknesses of individual models can be compensated for. In some embodiments, the weak learner library may comprise decision trees (DecisionTreeClassifier), random forests (RandomForestClassifier), and AdaBoost (AdaBoostClassifier). In some embodiments, the weak learner library may comprise an optimized gradient boosting library. These libraries provide implementations of weak learners that can be easily integrated into ensemble learning frameworks. By using these weak learners in combination, ensemble methods such as bagging, boosting, and stacking can be effectively applied to achieve better predictive performance and robustness in machine learning tasks.

Figure 3:
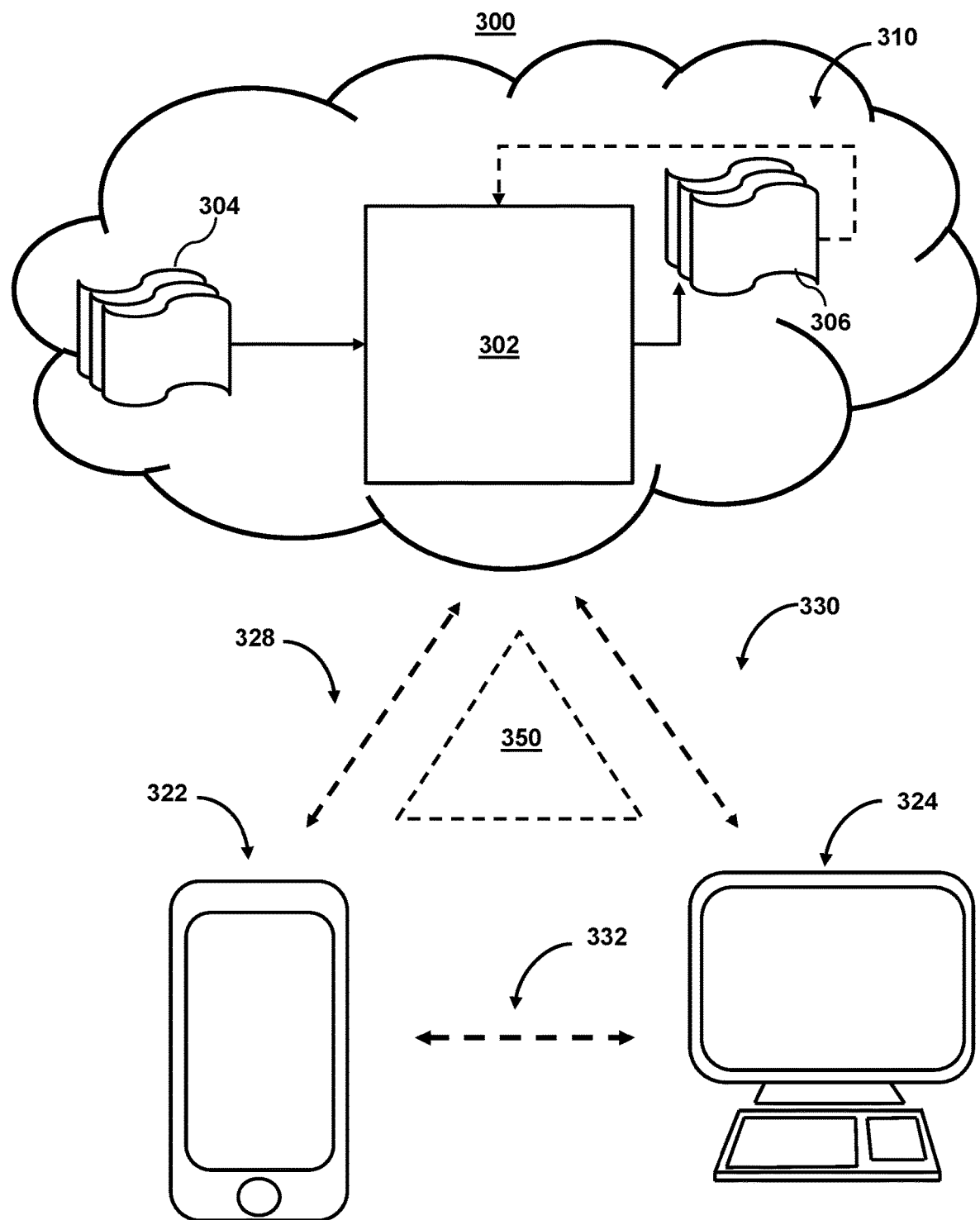
FIG. 3 shows illustrative components for a system used to prevent sensitive data leakage, in accordance with one or more embodiments.

FIG. 3 shows illustrative components for a system used to prevent sensitive data leakage, in accordance with one or more embodiments. For example, FIG. 3 may show illustrative components for preventing sensitive data leakage, using weak learner libraries, during label propagation. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a label).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a first classification in the first labeling task).

In some embodiments, the model (e.g., model 302) may automatically perform actions based on outputs 306. In some embodiments, the model (e.g., model 302) may not perform any actions. The output of the model (e.g., model 302) may be used to prevent sensitive data leakage.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
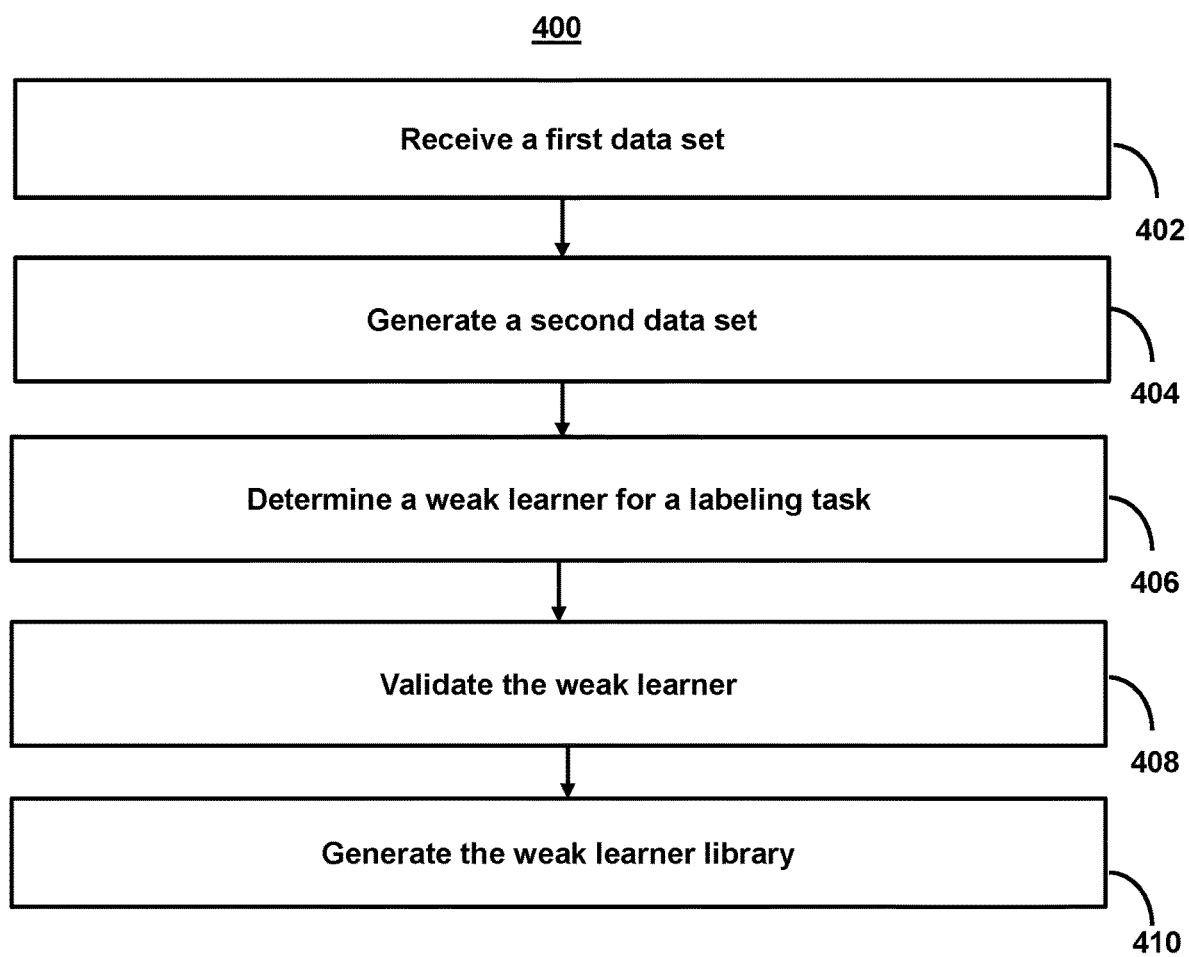
FIG. 4 shows a flowchart of the steps involved in preventing sensitive data leakage, using weak learner libraries, during label propagation, in accordance with one or more embodiments.

FIG. 4 shows a flowchart of the steps involved in preventing sensitive data leakage, using weak learner libraries, during label propagation, in accordance with one or more embodiments. For example, the system may use process 400 (e.g., as implemented on one or more system components described above) in order to generate and use weak learner libraries.

At step 402, process 400 (e.g., using one or more components described above) receives a first data set. For example, the system may receive a first data set, wherein the first data set comprises a plurality of sensitive characteristics. In some embodiments, the first data set may comprise actual data that requires labeling. For example, the system may need to perform label propagation on the first data set.

At step 404, process 400 (e.g., using one or more components described above) generates a second data set. For example, the system may generate a second data set, wherein the second data set is a synthetic data set corresponding to the first data set. The system may generate synthetic data that is artificial data that resembles the actual data but does not contain actual information from the actual dataset. The system may do so because there is a lack of actual data or sharing the actual data is not possible due to privacy/security concerns.

In some embodiments, the system may generate a latent representation of a characteristic. A latent representation of data characteristics may refer to a compressed and meaningful representation of the underlying structure and patterns present in the original data. It involves transforming the raw data into a lower-dimensional space, where the most relevant and informative features are retained while less important or noisy aspects are discarded. This lower-dimensional representation is often referred to as the "latent space." The system may obtain the latent representations using dimensionality reduction and/or autoencoders. For example, the system may reduce the number of dimensions in the data while preserving the essential information. Principal Component Analysis (PCA) and t-distributed Stochastic Neighbor Embedding (t-SNE) are examples of dimensionality reduction techniques used to obtain low-dimensional representations. Autoencoders are a type of neural network that consists of an encoder and a decoder. The encoder compresses the input data into a lower-dimensional representation (latent space), while the decoder attempts to reconstruct the original data from the latent representation. During training, autoencoders learn to capture the most important features in the data, which enables them to effectively encode and decode the input data. For example, the system may retrieve a first latent representation of a first characteristic from the first data set. The system may compare the first latent representation to characteristics of the second data set to determine whether first sensitive data of the first data set has been leaked. The system may determine whether to approve the second data set for use based on whether first sensitive data of the first data set has been leaked.

In some embodiments, the system may use random sampling to generate random data that matches the statistical properties of the actual dataset. For example, if the actual dataset has numerical values following a certain distribution, the system can generate new data points using a random number generator with the same distribution. For example, the system may determine a statistical property of the first data set. The system may generate the synthetic data set for the second data set using a random number generator and the statistical property.

In some embodiments, the system may use interpolation and extrapolation to generate synthetic data. For example, for tabular data, interpolation techniques like linear interpolation or spline interpolation can be used to generate new data points between existing ones. Extrapolation can also be used to create data points beyond the range of the existing data. For example, the system may determine the first data set is tabular data. The system may, in response to determining that the first data set is tabular data, select a first interpolation algorithm for generating the second data set.

In some embodiments, the system may use copula models to generate synthetic data. For example, copulas are used to model multivariate distributions by combining univariate distributions. The system can use copula models to generate new synthetic data that follows the same correlation structure as the actual data. For example, the system may determine a correlation structure of the first data set. The system may determine the synthetic data set for the second data set using a copula model and the correlation structure.

At step 406, process 400 (e.g., using one or more components described above) determines a weak learner for a labeling task. For example, the system may determine, based on the second data set, a first weak learner for a first labeling task, wherein the first labeling task is specific to the first data set. For example, the weak learner may be a classifier that makes predictions that are better than random guessing. The weak learner may be used to propagate labels from labeled data points to unlabeled data points during the label propagation process.

In some embodiments, the system may determine whether to approve a weak learner based on whether the weak learner is leaking characteristics of the first data set. For example, the system may determine whether or not the weak learner is based on actual data in the first data set, which may allow for sensitive data to be compromised. For example, the system may determine the first weak learner for the first labeling task by retrieving a second characteristic from the first data set. The system may then compare the second characteristic to characteristics of the first weak learner to determine whether second sensitive data of the first data set has been leaked. The system may determine whether to approve the first weak learner for use based on whether second sensitive data of the first data set has been leaked.

In some embodiments, the system may select a feature (or attribute) from the second dataset that a decision stump will use to split the second data. To do so, the system may evaluate each feature's relevance and importance. To determine relevance or importance, the system may use information gain or Gini impurity. For example, the system may determine a third characteristic from the second data set. The system may determine an importance of the third characteristic. The system may select the third characteristic as a feature for the first weak learner based on the importance.

In some embodiments, the system may determine splitting criterion. For example, once the feature is selected, the decision stump needs to determine the best threshold value for the chosen feature to create the split. The objective is to find the threshold that maximizes the separation of data points into different classes or categories. For example, when selecting the third characteristic as the feature for the first weak learner based on the importance, the system may determine a first value for a first classification in the first labeling task. The system may determine a second value for a second classification in the first labeling task. The system may determine a threshold value for the feature based on maximizing a difference between the first value and the second value.

In some embodiments, the system may use error minimization to generate the weak learner. For example, the system may select a decision stump that aims to minimize the classification error (or any other suitable metric) when making predictions. For example, for binary classification problems, the decision stump may assign the majority class to one side of the split and the minority class to the other side. For example, when determining the threshold value for the feature based on maximizing the difference between the first value and the second value, the system may determine a first classification error for the first classification. The system may then further determine the first value based on the first classification.

In some embodiments, the system may generate weak learners manually using one or more separated environments. For example, the system may have a first environment comprising actual data and another environment featuring synthetic data used by a model and/or model developer. To further provide separation of these environments, the protected environment may comprise remote execution to evaluate learners or a total ensemble on the actual data (e.g., when mixing and/or matching weak learners by the system and/or engineer.

At step 408, process 400 (e.g., using one or more components described above) validates the weak learner. For example, the system may validate, based on the first data set, the first weak learner. For example, validating a weak learner for label propagation may involve the system assessing its performance in propagating labels from the labeled data points to the unlabeled data points.

In some embodiments, the system may compare the performance of a weak learner to a threshold performance to evaluate how well a learner is performing. For example, the system may determine a threshold performance metric that the system uses as a benchmark. This could be a specific value, such as accuracy of 80%, an F1 score of 0.85, or any other relevant performance metric based on the labeling task and/or requirements. For example, when validating, based on the first data set, the system may determine, for the first weak learner, a labeling performance of the first labeling task. The system may compare the labeling performance to a threshold performance. The system may determine whether to approve the first weak learner for use based on comparing the labeling performance to the threshold performance.

At step 410, process 400 (e.g., using one or more components described above) generates the weak learner library. For example, the system may, in response to validating the first weak learner, add the first weak learner to a first weak learner library for the first data set. For example, the system may generate a weak learner library. A weak learner library may be a collection of machine learning algorithms or models that are designed to be simple and computationally efficient yet perform slightly better than random guessing on a given task. These weak learners may be used as building blocks in ensemble learning methods, where the system combines the learners to create a more powerful and accurate model.

In some embodiments, the system may validate, based on the first data set, the first weak learner library. For example, the system may generate the aggregate labeling accuracy using multiple weak learners. For example, the system may use ensemble methods like AdaBoost and Random Forests to create multiple weak learners to combine their predictions. Each decision stump may be trained on a subset of the second data or with modified weights to focus on the misclassified samples from the previous weak learners. In the case of boosting algorithms like AdaBoost, the weak learners are iteratively trained, and their errors are used to update the weights of the misclassified data points. This gives more emphasis to the misclassified samples, making the ensemble focus on hard-to-predict instances. For example, when validating the first weak learner library, the system may determine, for the first weak learner library, an aggregate labeling performance for a plurality of labeling tasks specific to the first data set. The system may compare the aggregate labeling performance to a threshold aggregate performance. The system may determine whether to approve the first weak learner library for use based on comparing the aggregate labeling performance to the threshold aggregate performance.

In some embodiments, the system may use weighted voting to generate the weak learner library. For example, after generating multiple weak learners, the system may combine the predictions through weighted voting or averaging. For example, the system may determine a first weight for the first weak learner. The system may determine a second weight for a second weak learner in the first weak learner library. The system may determine, based on the first weight and the second weight, an aggregate labeling performance for a plurality of labeling tasks specific to the first data set.

In some embodiments, the weights may be determined based on each weak learner's individual performance for a labeling task, and more accurate weak learners may receive higher weights in a final ensemble. For example, the system may determine, for the first weak learner, a labeling performance of the first labeling task. The system may determine the first weight based on the labeling performance.

In some embodiments, in response to validating the first weak learner library, the system may generate for display, on a user interface, a recommendation related to an additional weak learner to the first weak learner library. For example, the system may generate a recommendation to add, remove, and/or update a weak learner. As referred to herein, a "user interface" may comprise a human-computer interaction and communication in a device, and may include display screens, keyboards, a mouse, and the appearance of a desktop. For example, a user interface may comprise a way a user interacts with an application or a website.

In some embodiments, the system may recommend adding additional weak learners to the weak learner library in order to cure mislabeled or unlabeled data and/or to improve accuracy and coverage. For example, when generating for display the recommendation related to the additional weak learner to the first weak learner library, the system may determine, based on the second data set, a second weak learner for a second labeling task. The system may validate, based on the first data set, the second weak learner. The system may recommend adding the second weak learner to the first weak learner library in response to validating the second weak learner.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for preventing sensitive data leakage, using weak learner libraries, during label propagation.
2. The method of the preceding embodiments, further comprising receiving a first data set, wherein the first data set comprises a plurality of sensitive characteristics; generating a second data set, wherein the second data set is a synthetic data set corresponding to the first data set; determining, based on the second data set, a first weak learner for a first labeling task, wherein the first labeling task is specific to the first data set; validating, based on the first data set, the first weak learner; in response to validating the first weak learner, adding the first weak learner to a first weak learner library for the first data set; validating, based on the first data set, the first weak learner library; and in response to validating the first weak learner library, generating for display, on a user interface, a recommendation related to an additional weak learner to the first weak learner library.
3. The method of any one of the preceding embodiments, wherein generating the second data set further comprises: retrieving a first latent representation of a first characteristic from the first data set; comparing the first latent representation to characteristics of the second data set to determine whether first sensitive data of the first data set has been leaked; and determining whether to approve the second data set for use based on whether first sensitive data of the first data set has been leaked.
4. The method of any one of the preceding embodiments, wherein determining the first weak learner for the first labeling task further comprises: retrieving a second characteristic from the first data set; comparing the second characteristic to characteristics of the first weak learner to determine whether second sensitive data of the first data set has been leaked; and determining whether to approve the first weak learner for use based on whether second sensitive data of the first data set has been leaked.

5. The method of any one of the preceding embodiments, wherein validating, based on the first data set, the first weak learner further comprises: determining, for the first weak learner, a labeling performance of the first labeling task; comparing the labeling performance to a threshold performance; and determining whether to approve the first weak learner for use based on comparing the labeling performance to the threshold performance.

6. The method of any one of the preceding embodiments, wherein generating for display the recommendation related to the additional weak learner to the first weak learner library further comprises: determining, based on the second data set, a second weak learner for a second labeling task; validating, based on the first data set, the second weak learner; and recommending adding the second weak learner to the first weak learner library in response to validating the second weak learner.

7. The method of any one of the preceding embodiments, wherein validating the first weak learner library further comprises: determining, for the first weak learner library, an aggregate labeling performance for a plurality of labeling tasks specific to the first data set; comparing the aggregate labeling performance to a threshold aggregate performance; and determining whether to approve the first weak learner library for use based on comparing the aggregate labeling performance to the threshold aggregate performance.

8. The method of any one of the preceding embodiments, wherein validating the first weak learner library further comprises: determining a first weight for the first weak learner; determining a second weight for a second weak learner in the first weak learner library; and determining, based on the first weight and the second weight, an aggregate labeling performance for a plurality of labeling tasks specific to the first data set.

9. The method of any one of the preceding embodiments, wherein determining the first weight for the first weak learner further comprises: determining, for the first weak learner, a labeling performance of the first labeling task; and determining the first weight based on the labeling performance.

10. The method of any one of the preceding embodiments, wherein generating the second data set further comprises: determining a statistical property of the first data set; and generating the synthetic data set for the second data set using a random number generator and the statistical property.

11. The method of any one of the preceding embodiments, wherein generating the second data set further comprises: determining the first data set is tabular data; and in response to determining that the first data set is tabular data, selecting a first interpolation algorithm for generating the second data set.

12. The method of any one of the preceding embodiments, wherein generating the second data set further comprises: determining a correlation structure of the first data set; and determining the synthetic data set for the second data set using a copula model and the correlation structure.

13. The method of any one of the preceding embodiments, wherein determining, based on the second data set, the first weak learner for the first labeling task further comprises: determining a third characteristic from the second data set; determining an importance of the third characteristic; and selecting the third characteristic as a feature for the first weak learner based on the importance.

14. The method of any one of the preceding embodiments, wherein selecting the third characteristic as the feature for the first weak learner based on the importance further comprises: determining a first value for a first classification in the first labeling task; determining a second value for a second classification in the first labeling task; and determining a threshold value for the feature based on maximizing a difference between the first value and the second value.

15. The method of any one of the preceding embodiments, wherein determining the threshold value for the feature based on maximizing the difference between the first value and the second value further comprises: determining a first classification error for the first classification; and further determining the first value based on the first classification.

16. One or more non-transitory, machine-readable mediums storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

What is claimed is:

1. A system for preventing sensitive data leakage, using weak learner libraries and a plurality of environments, during label propagation, the system comprising:

one or more processors; and
one or more non-transitory, computer-readable mediums comprising instructions that when executed by the one or more processors causes operations comprising:
receiving a first data set at a first environment, wherein the first data set comprises a plurality of sensitive characteristics, wherein the first data set comprises actual data;
generating a second data set at a second environment, wherein the second data set is a synthetic data set corresponding to the first data set;
determining, based on the second data set at the second environment, a first weak learner for a first labeling task of a plurality of labeling tasks specific to the first data set;
validating, based on the first data set at the first environment, the first weak learner;
in response to validating the first weak learner at the first environment, adding the first weak learner to a first weak learner library for the first data set;
determining, based on the second data set at the second environment, a second weak learner for a second labeling task of the plurality of labeling tasks;
validating, based on the first data set at the first environment, the second weak learner;
adding the second weak learner to the first weak learner library in response to validating the second weak learner;
determining, for the first weak learner library, an aggregate labeling performance for the plurality of labeling tasks specific to the first data set;
comparing the aggregate labeling performance to a threshold aggregate performance; and determining whether to approve the first weak learner library for use based on comparing the aggregate labeling performance to the threshold aggregate performance.

2. A method for preventing sensitive data leakage, using weak learner libraries, during label propagation, the method comprising:
receiving a first data set, wherein the first data set comprises a plurality of sensitive characteristics;
generating a second data set, wherein the second data set is a synthetic data set corresponding to the first data set;
determining, based on the second data set, a first weak learner for a first labeling task, wherein the first labeling task is specific to the first data set;
validating, based on the first data set, the first weak learner;
in response to validating the first weak learner, adding the first weak learner to a first weak learner library for the first data set;
validating, based on the first data set, the first weak learner library; and
in response to validating the first weak learner library, generating for display, on a user interface, a recommendation related to an additional weak learner to the first weak learner library.

3. The method of claim 2, wherein generating the second data set further comprises:
retrieving a first latent representation of a first characteristic from the first data set;
comparing the first latent representation to characteristics of the second data set to determine whether first sensitive data of the first data set has been leaked; and
determining whether to approve the second data set for use based on whether first sensitive data of the first data set has been leaked.

4. The method of claim 2, wherein determining the first weak learner for the first labeling task further comprises:
retrieving a second characteristic from the first data set;
comparing the second characteristic to characteristics of first weak learner to determine whether second sensitive data of the first data set has been leaked; and
determining whether to approve the first weak learner for use based on whether second sensitive data of the first data set has been leaked.

5. The method of claim 2, wherein validating, based on the first data set, the first weak learner further comprises:
determining, for the first weak learner, a labeling performance of the first labeling task;
comparing the labeling performance to a threshold performance; and
determining whether to approve the first weak learner for use based on comparing the labeling performance to the threshold performance.

6. The method of claim 2, wherein generating for display the recommendation related to the additional weak learner to the first weak learner library further comprises:
determining, based on the second data set, a second weak learner for a second labeling task;
validating, based on the first data set, the second weak learner; and
recommending adding the second weak learner to the first weak learner library in response to validating the second weak learner.

7. The method of claim 2, wherein validating the first weak learner library further comprises:

determining, for the first weak learner library, an aggregate labeling performance for a plurality of labeling tasks specific to the first data set;
comparing the aggregate labeling performance to a threshold aggregate performance; and
determining whether to approve the first weak learner library for use based on comparing the aggregate labeling performance to the threshold aggregate performance.

8. The method of claim 2, wherein validating the first weak learner library further comprises:
determining a first weight for the first weak learner;
determining a second weight for a second weak learner in the first weak learner library; and
determining, based on the first weight and the second weight, an aggregate labeling performance for a plurality of labeling tasks specific to the first data set.

9. The method of claim 8, wherein determining the first weight for the first weak learner further comprises:
determining, for the first weak learner, a labeling performance of the first labeling task; and
determining the first weight based on the labeling performance.

10. The method of claim 2, wherein generating the second data set further comprises:
determining a statistical property of the first data set; and
generating the synthetic data set for the second data set using a random number generator and the statistical property.

11. The method of claim 2, wherein generating the second data set further comprises:
determining the first data set is tabular data; and
in response to determining that the first data set is tabular data, selecting a first interpolation algorithm for generating the second data set.

12. The method of claim 2, wherein generating the second data set further comprises:
determining a correlation structure of the first data set; and
determining the synthetic data set for the second data set using a copula model and the correlation structure.

13. The method of claim 2, wherein determining, based on the second data set, the first weak learner for the first labeling task further comprises:
determining a third characteristic from the second data set;
determining an importance of the third characteristic; and
selecting the third characteristic as a feature for the first weak learner based on the importance.

14. The method of claim 13, wherein selecting the third characteristic as the feature for the first weak learner based on the importance further comprises:
determining a first value for a first classification in the first labeling task;
determining a second value for a second classification in the first labeling task; and
determining a threshold value for the feature based on maximizing a difference between the first value and the second value.

15. The method of claim 14, wherein determining the threshold value for the feature based on maximizing the difference between the first value and the second value further comprises:
determining a first classification error for the first classification; and
further determining the first value based on the first classification.

16. One or more non-transitory computer-readable mediums comprising instructions recorded thereon that when executed by one or more processors causes operations comprising:

receiving a first data set, wherein the first data set comprises a plurality of sensitive characteristics;

generating a second data set, wherein the second data set is a synthetic data set corresponding to the first data set;

determining, based on the second data set, a first weak learner for a first labeling task, wherein the first labeling task is specific to the first data set;

validating, based on the first data set, the first weak learner; and in response to validating the first weak learner, adding the first weak learner to a first weak learner library for the first data set.

17. The one or more non-transitory computer-readable mediums of claim 16, wherein generating the second data set further comprises:

retrieving a first latent representation of a first characteristic from the first data set;

comparing the first latent representation to characteristics of the second data set to determine whether first sensitive data of the first data set has been leaked; and determining whether to approve the second data set for use based on whether first sensitive data of the first data set has been leaked.

18. The one or more non-transitory computer-readable mediums of claim 16, wherein determining the first weak learner for the first labeling task further comprises:

retrieving a second characteristic from the first data set;

comparing the second characteristic to characteristics of first weak learner to determine whether second sensitive data of the first data set has been leaked; and determining whether to approve the first weak learner for use based on whether second sensitive data of the first data set has been leaked.

19. The one or more non-transitory computer-readable mediums of claim 16, wherein validating, based on the first data set, the first weak learner further comprises:

determining, for the first weak learner, a labeling performance of the first labeling task;

comparing the labeling performance to a threshold performance; and determining whether to approve the first weak learner for use based on comparing the labeling performance to the threshold performance.

20. The one or more non-transitory computer-readable mediums of claim 16, wherein generating the second data set further comprises:

determining a statistical property of the first data set; and generating the synthetic data set for the second data set using a random number generator and the statistical property.

\* \* \* \* \*